US005563949A

United States Patent [19]
Bahorich et al.

[11] Patent Number: 5,563,949
[45] Date of Patent: Oct. 8, 1996

[54] METHOD OF SEISMIC SIGNAL PROCESSING AND EXPLORATION

[75] Inventors: Michael S. Bahorich, Arvada, Colo.;
Steven L. Farmer, Tulsa, Okla.

[73] Assignee: Amoco Corporation, Chicago, Ill.

[21] Appl. No.: 353,934

[22] Filed: Dec. 12, 1994

[51] Int. Cl.⁶ .................................................. G06F 19/00
[52] U.S. Cl. ............................................................ 364/421
[58] Field of Search .................................... 364/421, 422;
367/14, 40, 41, 42, 71, 72

[56] References Cited

U.S. PATENT DOCUMENTS

| | | | |
|---|---|---|---|
| 3,638,178 | 1/1972 | Stephenson | 367/71 |
| 3,931,609 | 1/1976 | Anstey | 367/72 |
| 4,403,312 | 9/1983 | Thomason | 367/56 |
| 4,799,201 | 1/1989 | Nelson | 367/41 |
| 4,892,807 | 1/1990 | Alam et al. | 367/14 |

*Primary Examiner*—Donald E. McElheny, Jr.
*Attorney, Agent, or Firm*—James A. Gabala; Robert E. Sloat

[57] ABSTRACT

A method for the exploration of hydrocarbons, comprising the steps of: obtaining a set of seismic signal traces distributed over a pre-determined three-dimensional volume of the earth; dividing the three-dimensional volume into a plurality of vertically stacked and generally spaced apart horizontal slices; dividing each of the slices into a plurality of cells having portions of at least three seismic traces located therein; measuring the cross-correlation between one pair of traces lying in one vertical plane to obtain an in-line value and the cross-correlation between another pair of traces lying in another vertical plane to obtain a cross-line value; combining the in-line value and the cross-line value to obtain one coherency value for each of the cells; and displaying the coherency values.

55 Claims, 5 Drawing Sheets

METHOD OF SEISMIC SIGNAL PROCESSING AND EXPLORATION

TECHNICAL FIELD

This invention relates to the general subject of seismic exploration and, in particular, to methods for identifying structural and stratigraphic features in three dimensions.

BACKGROUND OF THE INVENTION

Ordinary 2-D seismic data is acquired along lines (See lines 10 and 11 in FIG. 1) that consist of geophone arrays onshore or hydrophone streamer traverses offshore. Geophones and hydrophones act as sensors to receive energy that is transmitted into the ground and reflected back to the surface from subsurface rock interfaces 12. Energy is usually provided onshore by vibroseis vehicles which transmit pulses by shaking the ground at pre-determined intervals and frequencies on the surface. Offshore, airgun sources are usually used. Subtle changes in the energy returned to surface often reflect variations in the stratigraphic, structural and fluid contents of the reservoirs.

In 3-D seismic the principle is similar, however, lines and arrays are more closely spaced (See FIGS. 1 and 2) to provide more detailed subsurface coverage. With this high density coverage, extremely large volumes of digital data need to be recorded, stored and processed before final interpretation can be made. Processing requires extensive computer resources and complex software to enhance the signal received from the subsurface and to mute accompanying noise which masks the signal.

Once the data is processed, geophysical staff compile and interpret the 3-D seismic information in the form of a 3-D cube (See FIG. 4) which effectively represents a display of subsurface features. Using the data cube, information can be displayed in various forms. Horizontal time slice maps can be made at selected depths (See FIG. 5). Using a computer workstation an interpreter can slice through the field to investigate reservoir issues at different horizons. Vertical slices or sections can also be made in any direction using seismic or well data. Time maps can be converted to depth to provide a structural interpretation at a specific level.

Three-dimensional (3-D) seismic is being used extensively worldwide to provide a more detailed structural and stratigraphic image of subsurface reservoirs. Acceptance of 3-D seismic has accelerated during the last five years based on a proven track record that continues to grow. The 3-D payout has been measured by increased reserve estimates, cost savings from more accurate positioning of delineation and development wells, improved reservoir characterization leading to better simulation models, and the ability to predict more accurately future opportunities and problems during the production history of a field. More importantly, 3-D seismic has also been used as an exploration tool to reduce drilling risk in structurally complex areas and to predict reservoir quality in undrilled areas.

As good as 3-D seismic surveys and interpreters have become, improvements are needed.

In particular, seismic data has been traditionally acquired and processed for the purpose of imaging seismic reflections. Changes in stratigraphy are often difficult to detect on traditional seismic displays due to the limited amount of information that stratigraphic features present in a cross-section view. Although such views provide an opportunity to see a much larger portion of these features, it is difficult to identify fault surfaces within a 3-D volume where no fault reflections have been recorded. More importantly, seismic data is not known to have been acquired or used for the purpose of imaging seismic discontinuities instead of seismic reflections.

SUMMARY OF THE INVENTION

In accordance with the present invention, a method is disclosed for the exploration of hydrocarbons. The method comprises the steps of: obtaining a set of seismic signal traces distributed over a pre-determined three-dimensional volume of the earth; dividing the three-dimensional volume into a plurality of vertically stacked and generally spaced apart horizontal slices; dividing each of the slices into a plurality of cells that are arranged into laterally extending rows and columns and that have portions of at least three generally vertically extending seismic traces located therein; measuring across each of the cells the cross-correlation between one pair of traces lying in one vertical plane to obtain an in-line value and measuring the cross-correlation between another pair of traces lying in another vertical plane to obtain a cross-line value that are estimates of the time dip in an in-line direction and in a cross-line direction; combining the in-line value and the cross-line value to obtain one coherency value for each of the cells; and displaying the coherency values of the cells across at least one horizontal slice.

This technique is particularly well suited for interpreting fault planes within a 3-D seismic volume and for detecting subtle stratigraphic features in 3-D. This is because seismic traces cut by a fault line generally have a different seismic character than traces on either side of the fault. Measuring trace similarity, (i.e., coherence or 3-D continuity) along a time slice reveals lineaments of low coherence along these fault lines. Such coherency values can reveal critical subsurface details that are not readily apparent on traditional seismic sections. Also by calculating coherence along a series of time slices, these fault lineaments identify fault planes or surfaces.

Numerous other advantages and features of the present invention will become readily apparent from the following detailed description of the invention, the embodiments described therein, from the claims, and from the accompanying drawings.

DETAILED DESCRIPTION

Figure 1:
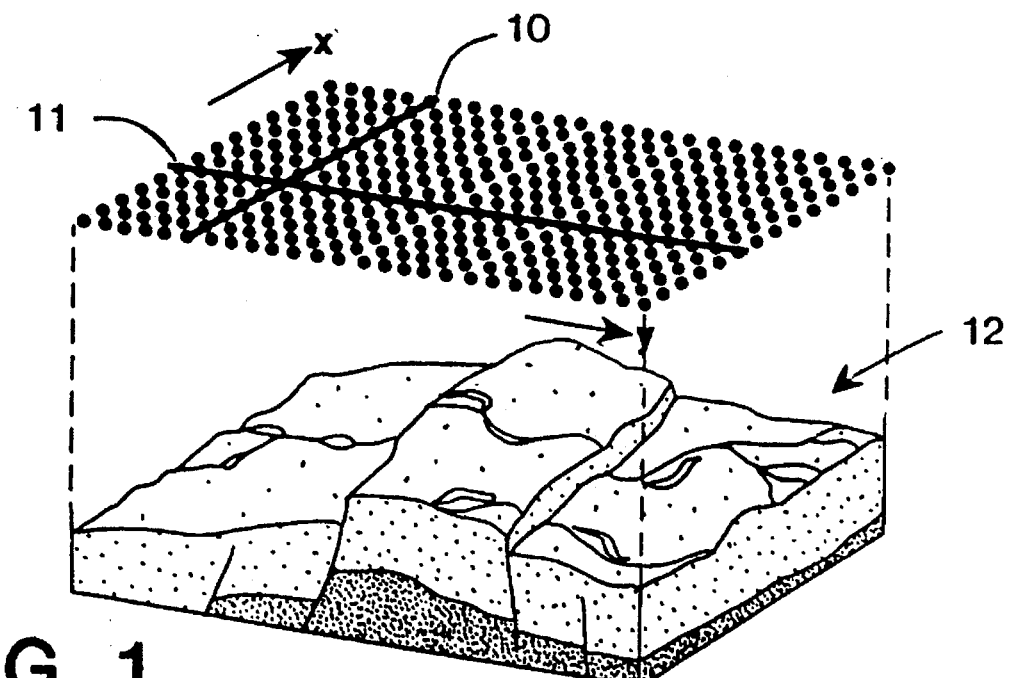
FIG. 1 illustrates an arrangement of geophones to obtain 3-D seismic data from the earth's subsurface for processing in accordance with the present invention.

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment or algorithm so described.

Figure 7:
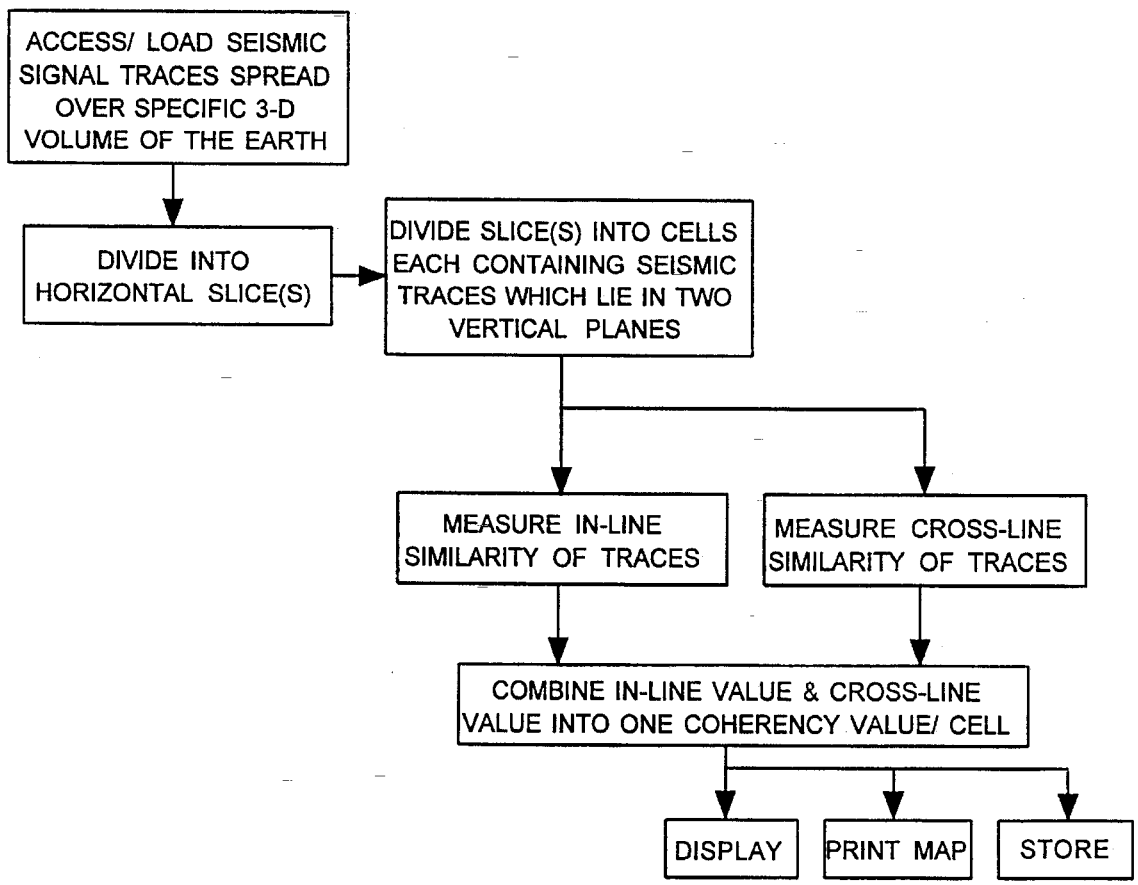
FIG. 7 is a simplified flow chart depicting the process of the invention.

Referring to FIG. 7, the first step is to obtain a set of seismic data in the form of seismic signal traces distributed over a three dimensional volume of the earth. Methods by which such data is obtained and reduced to digital form for processing as 3-D seismic data are well known to those skilled in the art.

The next step is to generate a "discontinuity cube." This is done by applying a coherency algorithm to the 3-D seismic data. This algorithm may take many forms. Whatever its form, its function is to compare the similarity of nearby regions of seismic data within the 3-D seismic volume. If a trace segment is similar to its neighbors (e.g., in the in-line and cross-line directions), it is assigned a low discontinuity value; if a trace segment is not similar to its neighbors, it is assigned a high discontinuity value.

Figure 2:
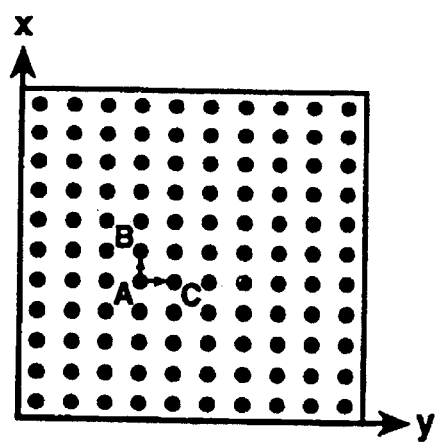
FIG. 2 is a plan view of the arrangement shown in FIG. 1.
Figure 3:
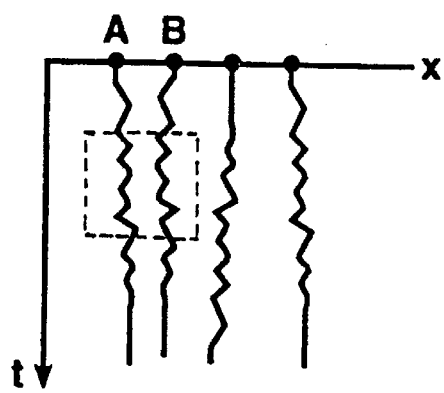
FIG. 3 is a representation of the seismic traces laying in a plane passing through one row of geophones shown in FIG. 2.
Figure 4:
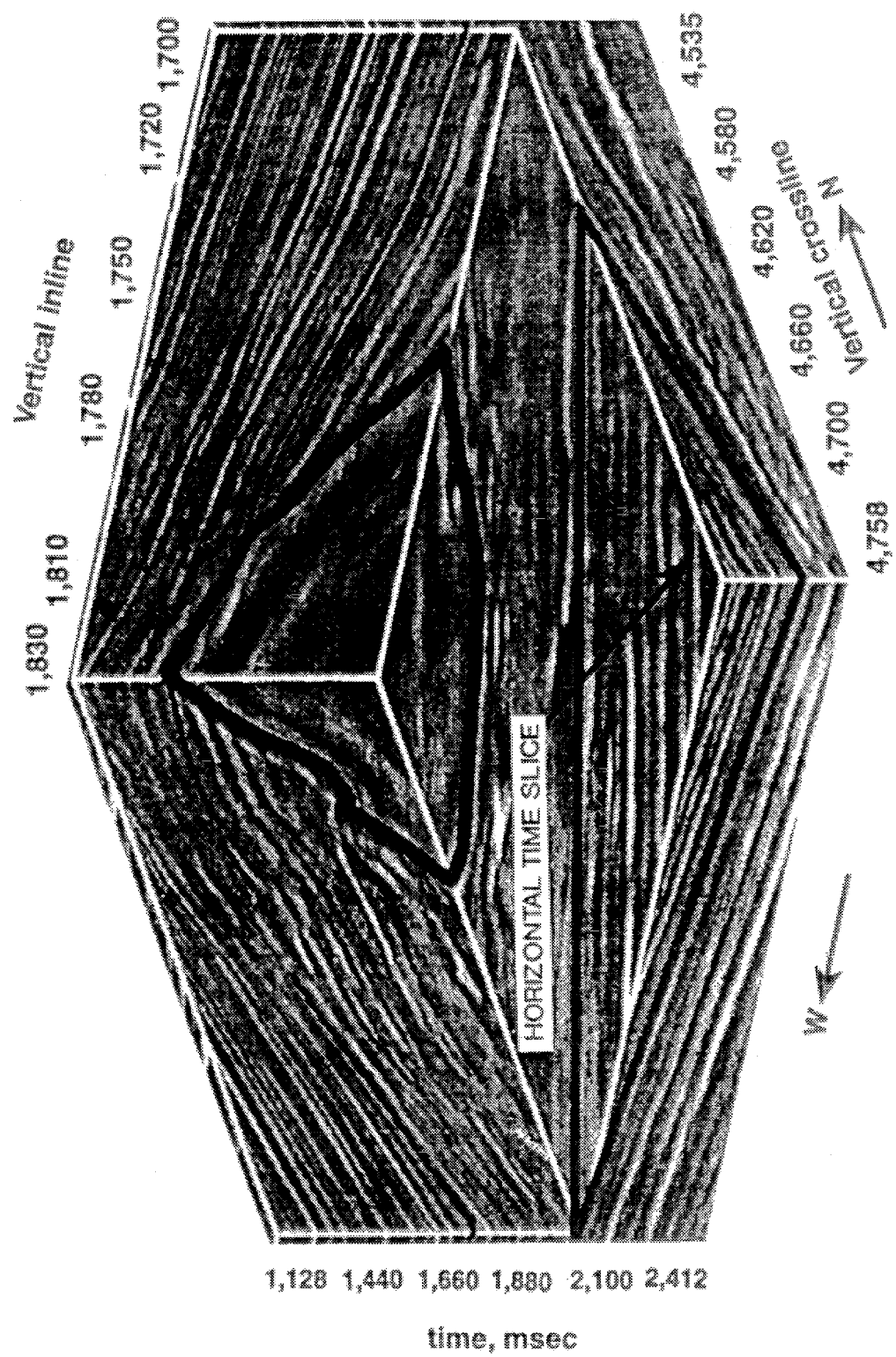
FIG. 4 is a pictorial representation of the information obtained from processing 3-D seismic data.

FIG. 2 is a plan view of a portion of 3-D seismic volume. In order to measure discontinuity, a trace segment at one point A is compared to adjacent trace segments B and C. One way to compute trace similarity is described below.

The zero mean lagged cross-correlation in the in-line (x-direction) between trace $u(t, x, y)$ and $u(t, x+dx, y)$ with a lag time of "tlag" msec is defined as:

$$\rho x(t, tlag) = \frac{\sum_{k=-w}^{k=+w} u(t+k, x, y)u(t+k+tlag, x+dx, y)}{\sqrt{a(t, x, y)a(t, x+dx, y)}}$$

where:

$$a(t, x, y) = \sum_{k=-w}^{k=+w} u^2(t+k, x, y)$$

and $$a(t, x+dx, y) = \sum_{k=-w}^{k=+w} u^2(t+k, x+dx, y)$$

are autocorrelations used to normalize the cross-correlation, and where w+w is the length in msec of the correlation window. It is important to choose w large enough so the assumption of zero mean is valid. Values on the order of a seismic wavelet are appropriate. Other methods of normalization may be used (e.g., product of the energies of the traces, etc.). In particular, cross correlation is one method of combining two waveforms to measure the similarities of the waveforms. Autocorrelation is a method of combining a waveform with itself. See Sheriff's "Encyclopedic Dictionary of Exploration Geophysics," Society of Exploration Geophysicists, Tulsa, Ok.

The zero mean lagged cross-correlation in the cross-line (y-direction) between trace $u(t, x, y)$ and $u(t, x, y+dy)$ with a lag time of tlag msec is defined as:

$$\rho_x(t, tlag) = \frac{\sum_{k=-w}^{k=+w} u(t+k, x, y)u(t+k+tlag, x, y+dy)}{\sqrt{a(t, x, y)a(t, x, y+dy)}}$$

where $$a(t, x, y+dy) = \sum_{k=-w}^{k=+w} u(t+k, x, y+dy)$$

The direction of apparent time dip in the x and y directions is estimated to be that lag (i.e., tlagx and tlagy) that has the greatest (i.e., most positive) cross-correlation. These values are $\rho_x$ (t, tlagx) and $\rho_y$ (t, tlagy).

Given the apparent dips (in msec/trace), it is a simple (but not necessarily accurate when dealing with noisy data) calculation to obtain dip and dip azimuth. More importantly, the concept of cross-correlation is extended to two dimensions by taking the geometric mean between the classical one dimensional cross-correlations:

$$p_{xy}(t, tlagx, tlagy) = \sqrt{\rho_x(t, tlagx) \rho_y(t, tlagy)}$$

This value (or attribute) serves as a rather robust estimate of signal discontinuity within geologic formations as well as signal discontinuities across faults and erosional unconformities.

Computer Program

A simplified FORTRAN 77 program for performing these calculations is given below: Given a trace "x" from a 3-D seismic amplitude volume, and its two neighboring traces "y" (in the in-line direction) and "z" (in the cross-line direction), subroutine COH calculates an output trace "rho" containing coherence coefficients using a running window cross-correlation algorithm where:

"mins" and "maxs" are the minimum and maximum sample indices for all four traces;

"inwinl" is the window length in samples;

"nlags" specifies the number of lags (relative time shifts) to do each side of "0" in the cross-correlation; and "sr" is the sample interval in ms. At each sample, subroutine CROSS calculates a series of normalized cross-correlation coefficients, returning the largest coefficients for each direction in "rho 1" and "rho2". The time shift at which the maximum coefficients occur is returned in "tshf1" and "tshf2"; these times are not used. Subroutine COH is called repeatedly, once for every trace in the input seismic amplitude volume, to produce a new 3-D data volume or "coherency cube" containing coherence coefficients.

```
subroutine coh (x, y, z, rho, mins, maxs, iwinl, nlags, sr)
real x(mins:maxs, y(mins:maxs), z(mins:maxs)
real rho(mins:maxs)
ihwin = iwinl/2
do j = mins+ihwin, maxs–ihwin
    k = j – ihwin
    call cross (x(k), iwinl, y(k), iwinl, nlags, sr, rho1, tshf1)
    call cross (x(k), iwinl, z(k), iwinl, nlags, sr, rho2, tshf2)
    rho(J) = sqrt (rho1*rho2)
enddo
return
end
subroutine cross (x, nx, y, ny, lags, sr, peak, tshift)
real x(0:nx–1), y(0:ny–1), sr, peak, tshift
parameter (maxlags=128)
real g(–maxlags:+maxlags)
```

-continued

```
double precision xx,yy
nlags = max(0, min(lags, maxlags))
tshift = 0.0
peak = 0.0
xx = 0.0
yy = 0.0
ks = 0
do ix = 0, nx-1
        xx = x(ix)**2+xx
enddo
if (xx.eq. 0.0) return
do iy = 0, ny-1
        yy = y(iy)**2 + yy
enddo
if (yy .eq. 0.0) return
do is = -nlags, +nlags
        g(is) = 0.0
        do it = 0, nx-1
            if (it-is .ge. 0) then
                if (it-is .le. ny-1)then
                    g(is) = g(is) + x(it)*y(it-is)
                endif
            endif
        enddo
        if (abs(peak) .lt. abs(g(is))) then
            peak = g(is)
            ks = is
        endif
enddo
tshift = ks*sr
peak = peak/sqrt (xx*yy)
return
end
```

Figure 5:
FIG. 5 is a pictorial representation of a horizontal time slice of 3-D seismic data processed in accordance with the prior art.
Figure 6:
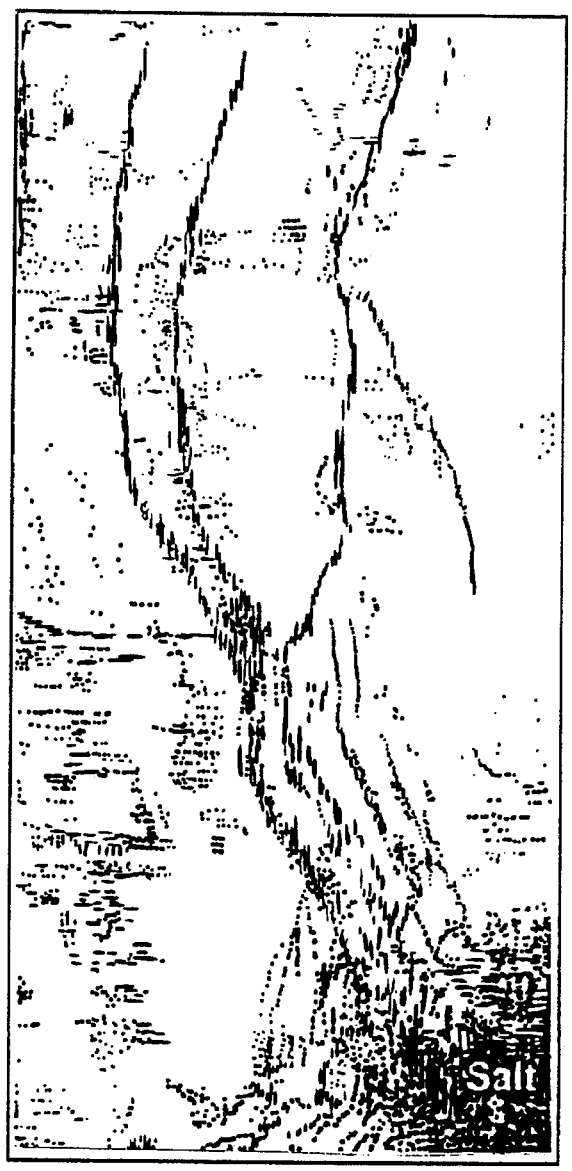
FIG. 6 is a pictorial representation of a horizontal time slice of 3-D seismic data processed in accordance with the present invention.
Figure 8:
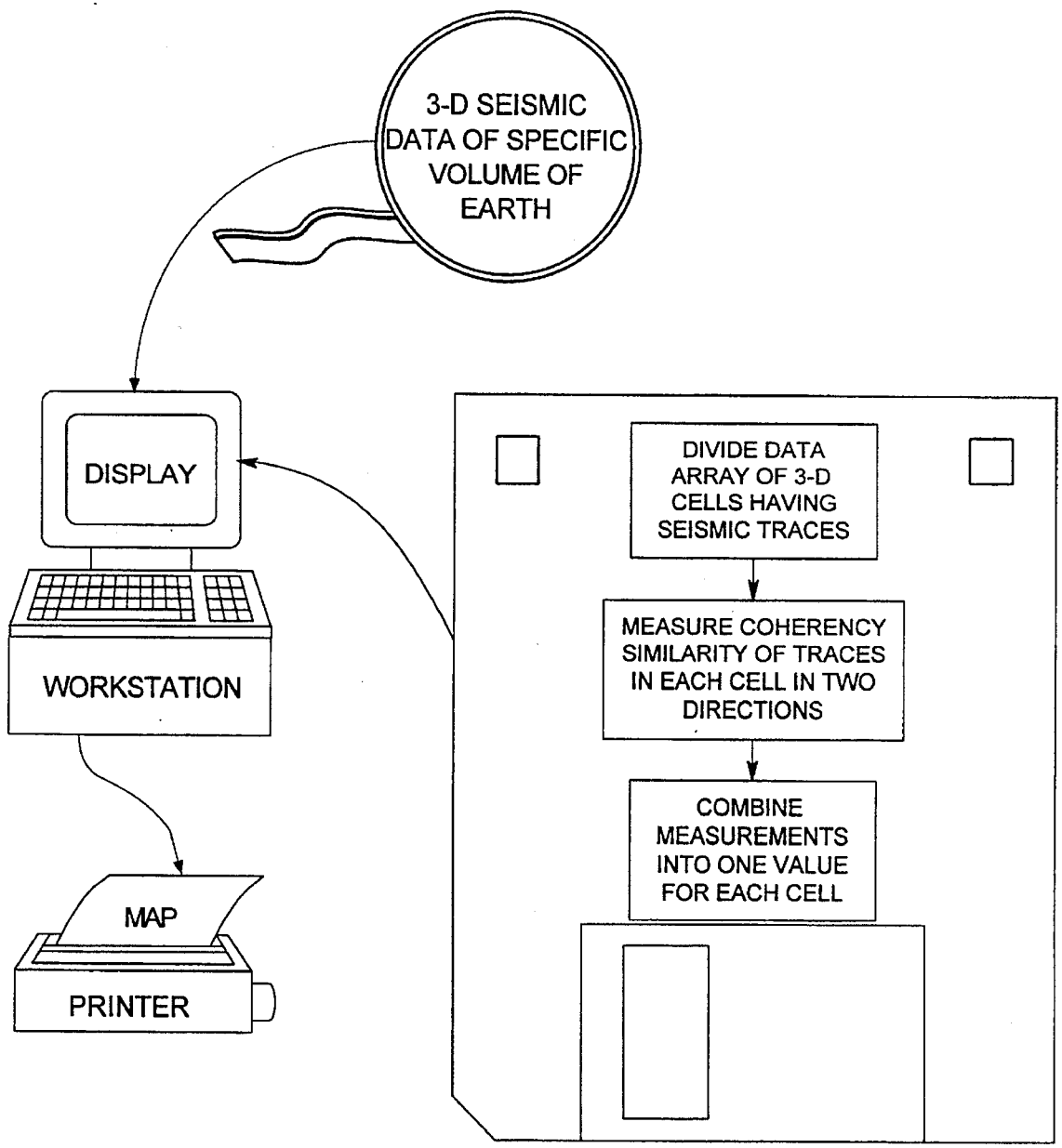
FIG. 8 is a schematic diagram depicting one embodiment of the invention.

Landmark and GeoQuest interpretive workstations, for example, can be used (see FIG. 8) to view and interpret faults and stratigraphic features by loading the discontinuity cube as a seismic volume. Visualization software (e.g., Landmarks's SeisCube software) may be employed to rapidly slice through the discontinuity volume to aid in understanding complex fault relationships. Discontinuity displays can reduce interpretation cycle time when used in selecting which seismic lines to interpret, enabling the interpreter to work around faults and poor data areas. In addition, subtle stratigraphic features and complex faulting which are not readily apparent on traditional seismic displays can be rapidly identified and interpreted. FIGS. 5 and 6 are side by side comparisons of the same seismic information displayed and processed conventionally and in accordance with the present invention. Fault lines are readily apparent in FIG. 6.

Coherency maps have been run on several 3-D surveys. At depths of reasonable data quality, approximately 90% of the faults can be readily identified. Faults were identified on coherency maps which were very subtle on seismic sections, but clearly present on the coherency maps because of the robustness of the method and the map perspective of fault patterns. Since coherency maps can be run on uninterpreted time slices, the present invention offers a means to greatly accelerate mapping of the structural framework and to reveal details of fault relationships which would otherwise be interpreted only through tedious fault picking.

Specific Examples

2-D seismic coherence maps were generated along picked horizons and clearly identified shale diapirs in offshore Nigeria.

In offshore Gulf of Mexico, the technique readily identified diapiric structures.

On several coherence time slices, remarkable detail of stratigraphic features, such as abandoned river channels, mud flows, and submarine canyons, was displayed. On seismic sections, these features were sometimes apparent but, in some cases, were unidentifiable even with close scrutiny.

This is the first known method of revealing fault planes within a 3-D volume where no fault reflections have been recorded. Faults are often critical to the accumulation of oil. A fault may form a seal by cutting off a structural or stratigraphic feature so the oil is trapped against the fault. On the other hand, if the fault plane contains rubble that has not been cemented, it may form a conduit for fluids. This may allow the hydrocarbons to drift up the fault plane into the feature and be trapped in it or to escape from the feature by drifting up the fault plane out of it.

Thus, fault lines can predict flow patterns in a reservoir and communication between injector and producing wells, for example. Seismic discontinuities can also provide the needed link to enable reservoir prediction between the wells and establish reservoir continuity and flow patterns across a field.

Coherency mapping of 3-D seismic is an extremely powerful and efficient tool for mapping both structure and stratigraphy. The new method is particularly sensitive to any lateral variation in wavelet character and therefore is particularly sensitive to the common causes of lateral variations in the wavelet (i.e., fault displacement or stratigraphic variations). This 3-D method analyzes a time-slice or horizon based interval and measures the maximum of the normalized cross-correlation in the in-line and cross-line directions.

Further Analysis

The discontinuity cube will clearly highlight fault planes as zones of high discontinuity. However, these zones may not be clearly in areas of lower signal-to-noise ratio. A method of enhancing these fault zones involves the application of a "median planar operator." Faults in the earth's subsurface generally express themselves as planes or surfaces. In the case of a curved fault surface, a series of small flat planes may be used to approximate the fault surface. In accordance with this aspect of the invention, a small planar operator is used to enhance (i.e., a "filter") the identification of subtle stratigraphic features. First, a small region of seismic data is selected around a center value. This region may be formed from a plurality of the cells used to form the "coherency cube." A small fault plane is then mathematically inserted into the region, and the median value of the points within the plane is calculated for the dip and azimuth that best aligns with the zone of high discontinuity. This median value is then assigned to the center value of a new array. Next, the region of data is shifted (e.g., by one row) and the process is repeated until each point in the previously determined discontinuity cube has been analyzed as a center value. The end result is a completely new discontinuity cube with fault planes enhanced and noise and stratigraphic features (i.e., non-planar features) attenuated. These stratigraphic features may be separated by subtracting the new discontinuity cube from the old discontinuity cube without the planar filter application.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Other algorithms may be used to measure the similarity of nearly regions of seismic data or to generate the "discontinuity cube." Moreover, equivalent computations may be substituted for those illustrated and described. Also certain features of the invention may be used independently of other features of the invention.

For example stratigraphic features have been generally identified on time slices where dips were low; and consequently, the time window captured a narrow statigraphic section. In areas of higher dip, the method should work on picked horizons. Therefore, as a stratigraphic mapping tool, there is good reason to believe that new levels of detail can be mapped than previously, although this may require mapping of the horizon of interest.

As another example, while coherence slice maps by themselves are very powerful mapping tools, when used in conjunction with reconnaissance mapping of amplitudes and dip maps, there is promise of a technological milestone in mapping effectiveness for the Gulf of Mexico or similar basins with 3-D seismic. It is believed that detailed mapping of structure and stratigraphy will be accelerated by mapping in a map view and less by traditional line by line picking. Interpretation in a map view of "reconnaissance" data offers significant improvement in quality and quantity of interpretation.

Thus it will be appreciated that various modifications, alternatives, variations, and changes may be made without departing from the spirit and scope of the invention as defined in the appended claims. It is, of course, intended to cover by the appended claims all such modifications involved within the scope of the claims.

We claim:

1. A method for the exploration of hydrocarbons, comprising the steps of:

a) obtaining a set of seismic signal traces distributed over a pre-determined three-dimensional volume of the earth;

b) dividing said three-dimensional volume into a plurality of vertically stacked and generally spaced apart horizontal slices and dividing at least one of said slices into a plurality of cells that are arranged into laterally extending rows and columns, each of said cells having portions of at least three seismic traces located therein, each of said portions of said traces generally extending vertically through said cells, and a first trace and a second trace in said cell lying in one generally vertical plane and a third trace and said first trace in said cell lying in another generally vertical plane that is generally at right angles to said one vertical plane;

c) measuring across each of said cells the cross-correlation between said traces lying in said one vertical plane to obtain an in-line value and the cross-correlation between said traces lying in said another vertical plane to obtain a cross-line value that are estimates of the time dip in an in-line direction and in a cross-line direction;

d) combining said in-line value and said cross-line value to obtain one coherency value for each of said cells; and e) displaying said coherency values of said cells across at least one of said horizontal slices.

2. The method of claim 1, wherein step (b) is performed on each of said horizontal slices; and where in step (e) said coherency values are displayed over successive horizontal slices.

3. The method of claim 1, wherein step (c) includes the step of normalizing each in-line value and each cross-line value.

4. The method of claim 3, wherein said step of normalizing includes the step of obtaining the product of the energies of each pair of traces.

5. The method of claim 3, wherein the auto-correlation of said traces lying in said one vertical plane and the auto-correlation of said traces lying in said another vertical plane are obtained to normalize said cross-correlations in the in-line direction and in the cross-line direction.

6. The method of claim 1, wherein step (c) comprises the steps of computing the zero mean lagged cross-correlation in said in-line direction, and computing the zero mean lagged cross-correlation in said cross-line direction.

7. The method of claim 6, wherein step (d) comprises the steps of identifying the most positive value of said zero mean lagged cross-correlation in said in-line direction, and identifying the most positive value of said zero mean lagged cross-correlation in the cross-line direction.

8. The method of claim 7, wherein step (d) comprises the step of computing the geometric mean between said two most positive values.

9. The method of claim 1, where in step (a) said set of seismic signal traces comprises a plurality of amplitude-versus-horizontal coordinate-and-time traces of seismic data.

10. The method of claim 1, where in step (a) said signal traces are digitally formatted.

11. The method of claim 1, wherein each of said horizontal slices of step (b) extends over about 100 milliseconds.

12. A method of locating subterranean features, faults, and contours, comprising the steps of:

a) obtaining 3-D seismic data covering a pre-determined volume of the earth;

b) dividing said volume into an array of relatively small three-dimensional cells wherein each of said cells is characterized by at least three laterally separated and generally vertical seismic traces located therein;

c) measuring in each said cells the coherency/similarity of said at least three traces relative to two pre-determined directions; and d) displaying said coherency/similarity of said cells to form a two-dimensional map of subterranean features.

13. The method of claim 12, where in step (c) said pre-determined directions are mutually perpendicular; and wherein said coherency/similarity of said cells is measured as a function of the cross-correlation between two traces in one direction and the cross-correlation between two traces in a direction that is perpendicular to said one direction.

14. The method of claim 13, wherein said coherency/similarity of said cells is measured as a function of the greatest cross-correlation in each of said two directions.

15. The method of claim 14, wherein said coherency/similarity is proportional to the geometric mean of said two greatest cross-correlations.

16. The method of claim 12, further including the step of:

e) displaying the coherencies/similarities of successive vertically separated horizontal arrays of three-dimensional cells to identify relative space and time invarient features.

17. In seismic exploration wherein 3-D seismic data comprising reflected seismic energy is recorded as a function of time to produce a series of seismic traces and wherein a computer is used that is adapted to process such seismic traces, an article of manufacture comprising:

a medium that is readable by a computer and that carries instructions for said computer to perform a process comprising the steps of:

(a) accessing 3-D seismic data over a predetermined volume;

(b) comparing the similarity of nearby regions of said 3-D seismic data of said volume by:

(1) dividing said volume into at least one horizontal slice and dividing said at least one slice into a plurality of cells that are arranged into laterally extending rows and columns, each of said cells having portions of at least three seismic traces extending therethrough including a first trace and a second trace that lie in one plane and a third trace that with said first trace lies in another plane that is generally at right angles to said one plane;

(2) measuring across each of said cells the coherency of said traces lying in said one plane to obtain a first value and the coherency of said traces lying in said another plane to obtain a second value;

(3) combining said first value and said second value in each cell to obtain one value that is representative of the coherency of said seismic traces in said cell; and (4) storing said combined coherency values of each cell of said at least one horizontal slice in a form for displaying said coherency values as a seismic attribute map.

18. A method of seismic exploration, comprising the steps of:

a) obtaining a 3-D seismic data set comprising seismic signal traces distributed over a volume of the earth;

b) dividing said volume into spaced apart horizontal slices and dividing each slice into cells that are arranged into laterally extending rows and columns, each of said cells having three seismic traces that generally extend vertically through said cells and in two generally vertical mutually perpendicular planes;

c) computing in each cell the cross-correlation between said traces lying in said one vertical plane to obtain an in-line value and the cross-correlation between said traces lying in said another vertical plane to obtain a cross-line value;

d) computing a coherency value for each of said cells, said coherency value being representative of the geometric mean of the most positive value of said cross-correlation in said in-line direction and the most positive value of said cross-correlation in the cross-line direction; and e) displaying said coherency values of said cells across at least one of said horizontal slices.

19. The article of manufacture of claim 17, wherein said medium carries instructions for said computer to perform step (2) by determining the cross-correlation between said first trace and said second trace, and determining the cross-correlation between said first trace and said third trace.

20. The article of manufacture of claim 19, wherein said medium carries instructions for said computer to perform step (2) by determining the zero mean lagged cross-correlation between said first trace and said second trace and determining the zero mean lagged cross-correlation between said first trace and said third trace.

21. The article of manufacture of claim 20, wherein said medium carries instructions for said computer to perform step (3) by identifying the most positive of each of said zero mean lagged cross-correlations.

22. The article of manufacture of claim 21, wherein said medium carries instructions for said computer to perform step (3) by further determining the geometric mean of said two most positive zero mean lagged cross-correlations.

23. An apparatus, comprising:

a) recorded means readable by a computer and carrying instructions for a process comprising the steps of:

(1) accessing a dataset comprising seismic signal traces distributed over a pre-determined three-dimensional volume of the earth;

(2) dividing said three-dimensional volume into a plurality of vertically stacked and generally spaced apart horizontal slices and dividing at least one of said slices into a plurality of cells that are arranged into laterally extending rows and columns, each of said cells having portions of at least three seismic traces located therein, each of said portions of said traces generally extending through said cells, and a first trace and a second trace in said cell lying in one plane and a third trace and said first trace in said cell lying in another plane that is generally at right angles to said one plane;

(3) computing across each of said cells the cross-correlation between said traces lying in said one plane to obtain an in-line value and the cross-correlation between said traces lying in said another plane to obtain a cross-line value that are estimates of the time dip in an in-line direction and in a cross-line direction; and (4) combining said in-line value and said cross-line value to obtain a coherency value for each of said cells.

24. The apparatus of claim 23 wherein step (3) comprises the steps of: obtaining the auto-correlation of said traces lying in said one plane; and obtaining the auto-correlation of said traces lying in said another plane to normalize said cross-correlations in said in-line direction and in said cross-line direction.

25. The apparatus of claim 23, wherein step (4) comprises the steps of: computing the zero mean lagged cross-correlation in said in-line direction; and computing the zero mean lagged cross-correlation in said cross-line direction.

26. The apparatus of claim 25 wherein step (4) comprises the steps of: identifying the most positive value of said zero mean lagged cross-correlation in said in-line direction; and identifying the most positive value of said zero mean lagged cross-correlation in said cross-line direction.

27. The apparatus of claim 26, wherein step (4) comprises the step of computing the geometric mean between said two most positive values.

28. In a computer adapted to receive 3-D seismic data and having a display for depicting processed 3-D seismic data, an article of manufacture comprising:

a) a medium that is readable by the computer and that carries instructions for the computer to perform a process comprising the steps of:

(1) arranging the 3-D data into a plurality of cells that are arranged into laterally extending rows and columns, each of said cells having portions of at least three seismic traces located therein, each of said portions of said traces generally extending vertically through said cells, said at least three seismic traces including a first trace and a second trace that lie in one generally vertical plane and a third trace that with said first trace lies in another generally vertical plane that is generally at right angles to said one vertical plane;

(2) calculating in said cells representations of the cross-correlation between said traces lying in said one vertical plane and calculating representations of the cross-correlation between said traces lying in said another vertical plane; and (3) combining said representations of the cross-correlation between said traces lying in said one vertical plane and said representations of the cross-corelation between said traces lying in said another vertical plane to obtain one coherency value for each of said cells.

29. The article of manufacture of claim 28, wherein said medium carries instructions for the computer to perform step (3) by combining a representation of the greatest cross-correlation in said one vertical plane and a representation of the greatest cross-correlation in said another vertical plane.

30. The article of manufacture of claim 29, wherein said medium carries instructions for the computer to combine said representations of the greatest cross-correlation in said one vertical plane and the greates cross-correlation in said another vertical plane by calculating a representation of the geometric means of said two greatest cross-correlations.

31. A device, comprising:
   a) pre-recorded means readable by a computer and carrying instructions for a process comprising the steps of:
      (1) reading into memory 3-D seismic data that covers a predetermined volume of the earth;
      (2) digitally sorting said data into an array of relatively small three-dimensional cells wherein each of said cells is characterized by at least three laterally separated and generally vertical seismic traces located therein;
      (3) calculating in each said cells a coherency value from said at least three traces relative to two pre-determined directions; and
      (4) storing said coherency values of said cells for the computer to display a two-dimensional map of subterranean features represented by said coherency values.

32. The device of claim 31, where in step (3) said two pre-determined directions are mutually perpendicular; and wherein said coherency value is computed as a function of the cross-correlation between two traces in one of said two mutually perpendicular directions and the cross-correlation between two traces in the other of said two mutually perpendicular directions.

33. The device of claim 32, wherein said coherency value is computer as a function of the greatest cross-correlation in said one direction and the greatest cross-correlation in said other direction.

34. The device of claim 33, wherein said coherency value is a function of the geometric mean of said two greatest cross-correlations.

35. A method of prospecting for hydrocarbon deposits, comprising the steps of:
   a) obtaining 3-D seismic data over a pre-determined three-dimensional volume of the earth;
   b) using a computer and a program for said computer that instructs said computer to perform the following steps:
      (1) reading said data and dividing said volume into an array of relatively small three-dimensional cells, wherein each of said cells has at least three laterally separated seismic traces located therein; and
      (2) calculating in each of said cells coherency values of said seismic traces; and
   c) using said computer to display said coherency values; and
   d) using said display to identify geological features and locations that are indicative of the location of an oil or gas deposit.

36. The method of claim 33, further including the step of e) drilling a well at a location identified in step (d).

37. The method of claim 35, wherein step (2) is performed by:
   (i) measuring the cross-correlation between one pair of traces relative to one vertical plane to obtain an in-line value and measuring the cross-correlation between another pair traces relative to another vertical plane to obtain a cross-line value; and
   (ii) combining said in-line value and said cross-line value to obtain a coherency value for said cell.

38. The method of claim 37, wherein step (ii) includes the step of identifying a maximum in-line cross-correlation and a maximum cross-line cross-correlation; and wherein said maximum cross-correlations are combined.

39. The method of claim 38, wherein said maximum cross correlations are combined by computing their geometric mean.

40. A device, comprising:
   a) pre-recorded means readable by a computer and carrying instructions for a process comprising the steps of:
      (1) reading stored data representative of seismic signal traces distributed over a pre-determined three-dimensional volume of the earth;
      (2) dividing said three-dimensional volume into a plurality of vertically stacked and generally spaced apart horizontal slices and dividing at least one of said slices into a plurality of cells that are arranged into laterally extending rows and columns, each of said cells having portions of at least three seismic traces located therein, each of said portions of said traces generally extending vertically through said cells, and a first trace of said three traces and a second trace of said three traces in said cell lying in one generally vertical plane and a third trace of said three traces and said first trace in said cell lying in another generally vertical plane that is generally at right angles to said one vertical plane;
      (3) measuring across each of said cells the cross-correlation between said traces lying in said one vertical plane to obtain an in-line value and the cross-correlation between said traces lying in said another vertical plane to obtain a cross-line value that are estimates of the time dip in an in-line direction and the time dip in a cross-line direction; and
      (4) combining said in-line value and said cross-line value to obtain one coherency value for each of said cells.

41. The device of claim 40, wherein said pre-recorded means is selected from the group consisting of a magnetic tape, a magnetic disk, an optical disk and a CD-ROM.

42. The device of claim 40, wherein step (4) comprises the steps of: computing the zero mean lagged cross-correlation in said in-line direction; and computing the zero mean lagged cross-correlation in said cross-line direction.

43. The device of claim 42, wherein step (4) comprises the steps of: identifying the most positive value of said zero mean lagged cross-correlation in said in-line direction; and identifying the most positive value of said zero mean lagged cross-correlation in the cross-line direction.

44. The device of claim 43, wherein step (4) comprises the step of computing the geometric mean between said two most positive values.

45. A method of locating subterranean features, faults, and contours, comprising the steps of:
   a) obtaining seismic data covering a pre-determined volume of the earth;

b) dividing said volume into an array of relatively small three-dimensional cells wherein each of said cells is characterized by at least three laterally separated and generally vertical seismic traces located therein;

c) measuring in each said cells the cross-correlation between two traces in one direction and the cross-correlation between two traces in a direction that is perpendicular to said one direction; and d) displaying a representation of said cross-correlation between two traces in one direction and said cross-correlation between two traces in a direction that is perpendicular to said one direction in the form a two-dimensional map.

46. The method of claim 45, wherein said representation of step (d) is a function of the greatest cross-correlation in each of said two directions.

47. The method of claim 45, wherein said representation of step (d) is a function of the geometric mean of said two cross-correlation.

48. A method of prospecting for hydrocarbon deposits, comprising the steps of:

a) obtaining 3-D seismic data over a pre-determined three-dimensional volume of the earth;

b) using a computer and a program for said computer that instructs said computer to perform the following steps:
  (1) reading said data and dividing said volume into an array of relatively small three-dimensional cells, wherein each of said cells has at least three laterally separated seismic traces located therein; and
  (2) calculating in each of said cells a coherency value for said seismic traces; and c) using said computer to make a map of said coherency values; and d) using said map to identify subsurface structural and sedimentological features commonly associated with the entrapment and storage of hydrocarbons.

49. The method of claim 48, wherein step (b) (2) is performed by:

(i) measuring in each cell the cross-correlation between one pair of traces relative to one vertical plane to obtain an in-line value and measuring the cross-correlation between another pair traces relative to another vertical plane to obtain a cross-line value; and (ii) combining said in-line value and said cross-line value to obtain a coherency value for said cell.

50. The method of claim 49, wherein step (ii) includes the step of identifying a maximum in-line cross-correlation and a maximum cross-line cross-correlation; and wherein said maximum cross-correlations are combined.

51. A seismic map prepared by a process, comprising the steps of:

(1) accessing, by means of a computer, a dataset comprising seismic signal traces distributed over a pre-determined three-dimensional volume of the earth;

(2) dividing said three-dimensional volume into a plurality of vertically stacked and generally spaced apart horizontal slices and dividing at least one of said slices into a plurality of cells that are arranged into laterally extending rows and columns, each of said cells having portions of at least three seismic traces located therein, each of said portions of said traces generally extending through said cells, and a first trace and a second trace in each cell lying in one plane and a third trace and said first trace in said cell lying in another plane that is generally at an angle to said one plane;

(3) computing across each cell the cross-correlation between said traces lying in said one plane to obtain an in-line value and computing the cross-correlation between said traces lying in said another plane to obtain a cross-line value that are estimates of the time dip in an in-line direction and in a cross-line direction;

(4) combining said in-line value and said cross-line value to obtain one coherency value for each cell; and (5) converting said stored coherency values into a printout of coherency values of said cells across at least one of said horizontal slices.

52. The seismic map of claim 51, wherein prior to step (5) said coherency values of said cells are digitally stored in a memory.

53. The seismic map of claim 51, wherein step (3) comprises the steps of: computing the zero mean lagged cross-correlation in said in-line direction; and computing the zero mean lagged cross-correlation in said cross-line direction.

54. The seismic map of claim 53 wherein step (4) comprises the steps of: identifying the most positive value of said zero mean lagged cross-correlation in said in-line direction; and identifying the most positive value of said zero mean lagged cross-correlation in the cross-line direction.

55. The seismic map of claim 54, wherein step (4) comprises the step of computing the geometric mean of said two most positive values.

\* \* \* \* \*

UNITED STATES PATENT AND TRADEMARK OFFICE
CERTIFICATE OF CORRECTION

PATENT NO.: 5,563,949
DATED: October 8, 1996
INVENTOR(S): Michael S. Bahorich, Steven L. Farmer It is certified that error appears in the above-identified patent and that said Letters Patent is hereby corrected as shown below:

| Col. | Line | |
|---|---|---|
| 5 | 21 | "if (abs(peak) .It. abs(g(is))) then" should read --if (abs(peak) .lt. abs(g(is))) then-- |
| 11 | 3 | "said representations of the cross-corelation" should read --said representations of the cross-correlation-- |
| 11 | 15-16 | "the greates cross-correlation in said another vertical plane" should read --the greatest cross-correlation in said another vertical plane-- |
| 11 | 42-43 | "said coherency value is computer as a function" should read --said coherency value is computed as a function-- |

Signed and Sealed this

Fifteenth Day of July, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,563,949
DATED : October 8, 1996
INVENTOR(S) : Michael S. Bahorich, Steven L. Farmer It is certified that error appears in the above-identified patent and that said Letters Patent is hereby corrected as shown below:

| Col. | Line | |
|---|---|---|
| 4 | 8 | "$u(t + k, x, y + dy)$" should read --$u^2(t + k, x, y + dy)$-- |
| 7 | 1 | "nearly" should read --nearby-- |

Signed and Sealed this

Twenty-eighth Day of April, 1998

Attest:

BRUCE LEHMAN

Attesting Officer        Commissioner of Patents and Trademarks